United States Patent
Zhang et al.

(10) Patent No.: US 12,282,481 B2
(45) Date of Patent: Apr. 22, 2025

(54) QUERY METHOD FOR DATA TABLE IN DATABASE, APPARATUS, COMPUTER DEVICE AND STORAGE MEDIUM

(71) Applicant: Beijing Volcano Engine Technology Co., Ltd., Beijing (CN)

(72) Inventors: Li Zhang, Los Angeles, CA (US); Wei Ding, Los Angeles, CA (US)

(73) Assignee: Beijing Vocano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/736,479

(22) Filed: Jun. 6, 2024

(65) Prior Publication Data
US 2025/0013645 A1    Jan. 9, 2025

(30) Foreign Application Priority Data
Jul. 6, 2023  (CN) .......................... 202310826168.7

(51) Int. Cl.
*G06F 16/2453* (2019.01)
*G06F 16/22* (2019.01)
*G06F 16/2455* (2019.01)

(52) U.S. Cl.
CPC .... *G06F 16/24549* (2019.01); *G06F 16/2255* (2019.01); *G06F 16/2456* (2019.01)

(58) Field of Classification Search
CPC ......... G06F 16/24549; G06F 16/24545; G06F 16/2456; G06F 16/2255
See application file for complete search history.

(56) References Cited

U.S. PATENT DOCUMENTS

| | | | |
|---|---|---|---|
| 10,810,200 B2 | 10/2020 | Beavin et al. | |
| 2008/0215556 A1* | 9/2008 | Surna | G06F 16/245 |
| 2018/0232417 A1 | 8/2018 | Das et al. | |
| 2020/0364226 A1* | 11/2020 | Li | G06F 16/9035 |
| 2021/0089535 A1* | 3/2021 | Chen | G06F 16/24542 |

FOREIGN PATENT DOCUMENTS

| | | | | |
|---|---|---|---|---|
| CN | 114661749 A | * | 6/2022 | .......... G06F 16/242 |
| CN | 114936223 A | * | 8/2022 | ......... G06F 16/2453 |
| CN | 117708169 A | * | 3/2024 | |
| EP | 4177767 A1 | * | 5/2023 | .......... G06F 11/3409 |

OTHER PUBLICATIONS

"HashJoin performance optimization: RuntimeFilter", Retrieved from URL : https://cloud.tencent.com/developer/article/2096691, Oct. 27, 2022, pp. 1-18.
Extended European Search Report for European Application No. 24180467.3, mailed Nov. 12, 2024, 9 pages.

* cited by examiner

*Primary Examiner* — James E Richardson (57) ABSTRACT

The present disclosure provides a query method for a data table in a database, an apparatus, a computer device and a storage medium. The method includes: acquiring a data table query instruction, the data table query instruction is used to perform a Hash Join query operation on target join columns of a plurality of data tables in the database; constructing, in a build phase of the Hash Join, a hash data table according to tabular data corresponding to a target join column of a first data table among the plurality of data tables; determining, based on table statistical information of the hash data table, whether to construct a runtime filter for filtering a second data table in a probe phase of the Hash Join; and if so, determining a data query result with the constructed runtime filter based on the hash data table and the second data table.

20 Claims, 3 Drawing Sheets

QUERY METHOD FOR DATA TABLE IN DATABASE, APPARATUS, COMPUTER DEVICE AND STORAGE MEDIUM

CROSS-REFERENCE TO RELATED APPLICATIONS

This application claims the priority to and benefits of the Chinese Patent Application, No. 202310826168.7, which was filed on Jul. 6, 2023. The aforementioned patent application is hereby incorporated by reference in its entireties.

TECHNICAL FIELD

The present disclosure relates to the field of computer technology, in particular, to a query method for a data table in a database, apparatus, computer device and storage medium.

BACKGROUND

Structured Query Language (SQL) database, as a type of database with rich functionality, play an important role in the field of information storage and information processing. The data query function, which is an important function of the SQL database, corresponds to a variety of query instructions for data query, and the query instructions with Join, which is a common query instruction, plays an important role in searching data.

Runtime filter, as an optimization function widely used in the field of database and big data processing, has a reliable optimization effect for query instructions with Join, and is particularly suitable for query instructions with Hash Join.

However, not all Hash Join queries (query instructions with Hash Join) can be optimized with the Runtime filter, and if Runtime filter cannot achieve a well filter effect, using the Runtime filter blindly will result in additional performance consumption and system burden for data queries. Thus, how to determine whether a Hash Join query can be performed with the Runtime filter becomes essentially important.

SUMMARY

Embodiments of the present disclosure provide a query method for a data table in a database, an apparatus, a computer device and a storage medium.

In a first aspect, embodiments of the present disclosure provide a query method for a data table in a database. The method includes:

acquiring a data table query instruction, wherein the data table query instruction is used to perform a Hash Join query operation on target join columns of a plurality of data tables in the database;

constructing, in a build phase of the Hash Join query operation, a hash data table according to tabular data corresponding to a target join column of a first data table among the plurality of data tables;

determining, based on table statistical information of the hash data table, whether to construct a runtime filter for filtering a second data table of the plurality of data tables in a probe phase of the Hash Join query operation; and determining a data query result with a constructed runtime filter based on the hash data table and the second data table in response to it is determined that the runtime filter needs to be constructed.

In an alternative implementation, the determining a data query result with the constructed runtime filter based on the hash data table and the second data table includes:

generating a data filter condition based on the hash data table;

filtering data of the second data table according to the data filter condition with the constructed runtime filter to obtain filtered data; and determining the data query result based on the filtered data and the hash data table.

In an alternative implementation, the Hash Join query operation includes the build phase, the probe phase and a query phase, and wherein the build phase, the probe phase and the query phase run on different computing nodes deployed in a distributed system respectively.

In an alternative implementation, the determining, based on table statistical information of the hash data table, whether to construct a runtime filter for filtering a second data table of the plurality of data tables in a probe phase of the Hash Join includes:

determining a query performance improvement result after constructing the runtime filter according to the table statistical information;

determining a query performance consumption result after constructing the runtime filter according to a table data amount of the hash data table; and determining whether to construct the runtime filter according to a comparing result of the query performance improvement result and the query performance consumption result.

In an alternative implementation, the determining a query performance improvement result after constructing the runtime filter according to the table statistical information includes:

determining a data selection rate corresponding to the runtime filter after the runtime filter is constructed according to the table statistical information; and determining the query performance improvement result according to the data selection rate.

In an alternative implementation, the determining a data selection rate corresponding to the runtime filter after the runtime filter is constructed according to the table statistical information includes:

determining output row number information at the query phase of the Hash Join query operation based on the table statistical information and estimated table statistical information corresponding to the second data table; and determining the data selection rate based on the output row number information and input row number information of the second data table.

In an alternative implementation, the estimated table statistical information is determined according to the following steps:

when there is at least one low-level leaf node of a computing node to which the second data table corresponds, determining a target leaf node of a lowest level of the at least one low-level; and determining the estimated statistical information corresponding to the second data table according to a node data table corresponding to the target leaf node.

In a second aspect, embodiments of the present disclosure further provide a query apparatus for a data table in a database, which includes:

an acquiring circuit, configured to acquire a data table query instruction, wherein the data table query instruction is used to perform a Hash Join query operation on target join columns of a plurality of data tables in the database;

a constructing circuit, configured to construct, in a build phase of the Hash Join query operation, a hash data table according to tabular data corresponding to a target join column of a first data table among the plurality of data tables;

a deciding circuit, configured to determine, based on table statistical information of the hash data table, whether to construct a runtime filter for filtering a second data table of the plurality of data tables in a probe phase of the Hash Join query operation; and a first determining circuit, configured to determine a data query result with a constructed runtime filter based on the hash data table and the second data table in response to it is determined that the runtime filter needs to be constructed.

In a third aspect, embodiments of the present disclosure further provide a computer device. The computer device includes a processor and a memory storing machine-readable instructions executable by the processor, wherein the processor is configured to execute the machine-readable instructions stored in the memory, the machine-readable instructions, when executed by the processor, cause the processor to implement the steps in the first aspect or any alternative implementation of the first aspect.

In a fourth aspect, embodiments of the present disclosure further provide a non-transitory computer-readable storage medium, wherein the storage medium has a computer program stored thereon which, when executed by a computer device, cause the computer device to implement the steps in the first aspect or any alternative implementation of the first aspect.

The description of the effects of the query apparatus for a data table in a database, the computer device, and the computer-readable storage medium refers to the description of the above query method for a data table in a database, and will not be repeated here.

In the query method for a data table in a database, the apparatus, the computer device and the storage medium according to the embodiments of the present disclosure, whether to construct a runtime filter for data filtering is determined after a hash data table is constructed according to tabular data corresponding to a target join column of a first data table. Thus, it can use the real table statistical information corresponding to the hash data table to determine the filtering effect of using a runtime filter, and then accurately determine whether a runtime filter is suitable for the current Hash Join query, that is, accurately determine whether a runtime filter can improve the query performance of the current Hah Join query. Then, when it is determined that a runtime filter needs to be constructed, a runtime filter is constructed and is used for data filtering. Thus, this can achieve accurate filtering of the data that needs to be queried and obtaining accurate data query results, thereby, the performance of data queries can be improved, and the reasonable use of runtime filters can be achieved.

Further, in the query method for a data table in a database, the apparatus, the computer device and the storage medium according to the embodiments of the present disclosure, in a distributed system, the step of determining whether to construct a runtime filter can be lowered to the computing node corresponding to the probe phase, this enables each computing node to determine whether a runtime filter is needed based on local real table statistical information, thus, rationality and accuracy of using the runtime filters for each computing node can be improved.

In order that the above objects, features and advantages of the present disclosure will be more apparent, the following detailed description of the embodiments will be described with reference to the accompanying drawings.

BRIEF DESCRIPTION OF DRAWINGS

In order to more clearly illustrate the technical solutions of the embodiments of the present disclosure, the accompanying drawings required for implementing the embodiments, which are incorporated in and constitute a part of the specification, illustrate embodiments consistent with the present disclosure and, together with the description, serve to explain the technical solutions of the present disclosure, will be briefly described below. It is to be understood that the following drawings illustrate only certain embodiments of the present disclosure and are therefore not to be considered limiting in scope, and that other related drawings may be derived therefrom by one of ordinary skill in the art without inventive step.

DETAILED DESCRIPTION

To make the objects, technical solutions and advantages of the embodiments of the present disclosure clearer, the technical solutions in the embodiments of the present disclosure will be clearly and completely described below in conjunction with the accompanying drawings in the embodiments of the present disclosure, it is obvious that the described embodiments are only a part of the embodiments of the present disclosure, rather than all of the embodiments. The components of the embodiments of the present disclosure as generally described and illustrated herein could be arranged and designed in a wide variety of different configurations. Thus, the following detailed description of the embodiments of the disclosure is not intended to limit the scope of the disclosure, as claimed, but is merely representative of selected embodiments of the disclosure. Based on the embodiments of the present disclosure, all other embodiments obtained by those skilled in the art without making creative labor belong to the scope of protection of the present disclosure.

Furthermore, the terms "first", "second" and the like in the description and claims and above drawings in embodiments of the present disclosure are used for distinguishing between similar objects and not necessarily for describing a particular sequential or chronological order. It is to be understood that such use of data may be interchanged under appropriate circumstances such that the embodiments described herein are capable of being practiced in sequences other than those illustrated or described herein.

References herein to a "plurality or several" means two or more. "And/or", describing an association relationship of an associated object, means that three kinds of relationships may exist, for example, A and/or B may mean that A exists alone, A and B exist simultaneously, and B exists alone. The character "/" generally indicates that the contextual object is an "OR" relationship.

It has been found that when using a Runtime filter to perform a Hash Join query, using the Runtime filter is not a process that does not require resource consumption, but that there are at least two portions of the resource consumption, one of which is the resource consumption of creating the Runtime filter and the other of which is the resource consumption of data filtering by using the Runtime filter. Also, if the Runtime filter is not highly filtered and not well filtered, blindly using the Runtime filter not only does not result in an increase in query performance, it also imposes an additional burden on the system, increases resource consumption, and decreases data query performance.

In order to avoid the performance degradation caused by blindly using Runtime filter, the conventional approach is to use a cost estimation model to estimate the effects of using Runtime filter in advance before starting a Hash Join query, and determine that Runtime filter can be used when the estimated resource consumption of using Runtime filter is lower than the query performance improvement caused by using Runtime filter, and vice versa. The accuracy of the results predicted by the cost estimation model depends on the predicted table statistical information corresponding to each computing node, and therefore, the accuracy of the predicted table statistical information determines the accuracy of the determination. However, conventional table statistical information estimate, which has always been an industry pain point, that accuracy is unstable, and that accuracy becomes lower as query complexity increases.

At the same time, the problem of low accuracy is further amplified for many distributed systems. The reason is that a plurality of computing nodes may be included in the distributed system, and whether each computing node needs to use Runtime filter is uniformly determined based on the corresponding global estimation information of the entire distributed system, so that the determination result is not applicable to all nodes in the distributed system, and the accuracy of the determination result is affected, and the performance of data inquiry is degraded. Thus, how to accurately determine whether a Hash Join query can be performed with a Runtime filter becomes a technical pain point.

Based on the above studies, embodiments of the present disclosure provides a query method for a data table in a database, an apparatus, a computer device and a storage medium, whether to construct a runtime filter for data filtering is determined after a hash data table is constructed according to tabular data corresponding to a target join column of a first data table. Thus, it can use the real table statistical information corresponding to the hash data table to determine the filtering effect of using a runtime filter, and then accurately determine whether a runtime filter is suitable for the current Hash Join query, that is, accurately determine whether a runtime filter can improve the query performance of the current Hah Join query. Then, when it is determined that a runtime filter needs to be constructed, a runtime filter is constructed and is used for data filtering. Thus, this can achieve accurate filtering of the data that needs to be queried and obtaining accurate data query results, thereby, the performance of data queries can be improved, and the reasonable use of runtime filters can be achieved.

The deficiencies of the above solutions are all the results of the inventor's practice and careful study, and therefore, the discovery process of the above problems and the solutions proposed by the present disclosure to the above problems hereinafter should be contributions made by the inventor to the present disclosure during the course of the present disclosure.

It should be noted that similar numerals and terms represent similar items in the following figures, and therefore, once an item is defined in one figure, it need not be further defined and explained in the following figures.

It can be understood that before using the technical solution disclosed by the embodiments of the present disclosure, the user should be informed of the type, the use range, the use scenario, and the like of the personal information to which the present disclosure relates and obtain the authorization of the user in an appropriate manner in accordance with the relevant laws and regulations.

It is to be noted that specific nouns mentioned in the embodiments of the present disclosure include:

Join: this is a common operation between database tables to compose a new table by extracting a column-equal tuple between multiple tables. If the two tables have an excessive number of tuples, the overhead of traversing one by one is large, and hash concatenation is one way to improve concatenation efficiency. A Hash Join is one of Join operations, which may include a build phase and a probe phase, based on which a Join query operation on a database table may be implemented.

runtime filter: this is an optimization function widely used in the field of database and big data processing, and is applicable to dynamic query conditions and aims to filter out data corresponding to the probe end that does not hit a Join ahead of the Join, in order to reduce data transmission and computation when performing a Join operation.

To facilitate understanding of the present disclosure, first, a detailed introduction is made to the query method for a data table in a database disclosed by embodiments of the present disclosure, the execution body of the query method provided by the embodiments of the present disclosure is generally a terminal device or other processing devices with certain computing capability, wherein the terminal device may be a User Equipment (UE), a mobile device, a user terminal, a terminal, a Personal Digital Assistant (PDA), a handheld device, a computer device, etc.; In some possible implementations, the query method may be implemented by way of a processor invoking computer readable instructions stored in a memory.

Hereinafter, the query method provided by the embodiments of the present disclosure is explained by taking the execution body as a computer device as an example.

Figure 1:
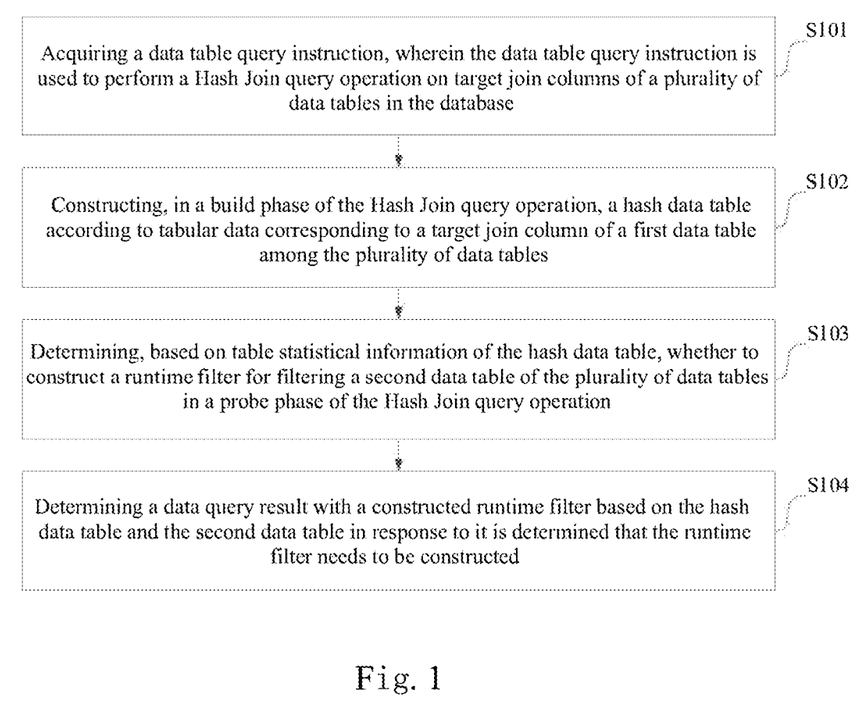
FIG. 1 shows a flowchart of a query method for a data table in a database according to embodiments of the present disclosure.

As shown in FIG. 1, a flow chart of a query method for a data table in a database provided by embodiments of the present disclosure may include the following steps:

S101: acquiring a data table query instruction, wherein the data table query instruction is used to perform a Hash Join query operation on target join columns of a plurality of data tables in the database.

Here, the data table may be a data table in a SQL database, and the data table query instruction is configured to perform a Hash Join query operation, i.e., a Hash Join, on a plurality of data tables in the database. Illustratively, the data table query instruction may be a Hash Join instruction for two data tables in the database.

Each data table may include at least one row of row data and at least one column of column data, a target join column may be a column of the data table where a Hash Join needs to be performed, and a target join column may also be referred to as a Join key column of both data tables. In the data table query instruction, target join columns respectively corresponding to two data tables that need to be queried may be included. For example, an instruction content like "table1_column1=table2_column2" may be included in the data table query instruction, i.e., indicating that two tables that need to perform a Hash Join are table 1 (i.e., table1) and table 2 (i.e., table2), where table1 corresponds to a target join column of column 1 (i.e., column1) and table2 corresponds to a target join column of column 2 (i.e., column2).

When implemented, when a Hash Join operation needs to be performed on two data tables in the SQL database, the generated data table query instruction for the two data tables may be retrieved.

S102: constructing, in a build phase of the Hash Join query operation, a hash data table according to tabular data corresponding to a target join column of a first data table among the plurality of data tables.

Figure 2:
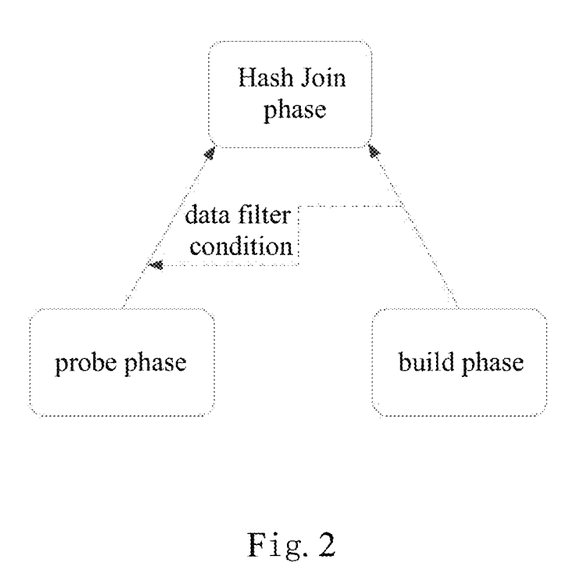
FIG. 2 shows a schematic diagram illustrating phases of a Hash Join operation according to embodiments of the present disclosure.

Here, it needs to be explained first that the execution process of the Hash Join may include wo execution phases as shown in FIG. 2, namely a build phase and a probe phase as shown in FIG. 2, wherein the build phase and the probe phase are respectively used for processing the two data tables indicated in the data table query instruction, specifically, the build phase may be used for processing the first data table of the two data tables and the probe phase is used for processing the second data table of the two data tables. After the build phase is completed, the probe phase may be executed, the result of execution of the build phase may be used by the probe phase, and a Hash Join result may be finally obtained based on the result of execution of the build phase and the result of execution of the probe phase.

The plurality of data tables indicated in the data table query instruction may specifically be two data tables, and in a case where the table data amounts of the two data tables are consistent: a first data table of the two data tables may be either data table and a second data table of the two data tables may be another data table than the first data table. In a case where the table data amounts of the two data tables are not consistent, the data table with the smaller table data amount may be taken as the first data table and the data table with the larger table data amount may be taken as the second data table. That is, in the case where the two data tables are of different sizes, the smaller data table may be the first data table and the larger data table may be the second data table. The tabular data corresponding to the target Join column may include column data corresponding to the target data column.

Illustratively, the Hash Join query operation may begin to be performed after the data table query instruction is retrieved. Specifically, a build phase as shown in FIG. 2 may be first performed to determine a first data table having a smaller amount of table data from the two data tables indicated by the data table query instruction; Then, a hash operation is performed on the tabular data corresponding to the target join column in the first data table, resulting in a hash data table. In this manner, storage of the tabular data corresponding to the target join column into the hash data table data structure in memory may be achieved.

In an implementation, a Hash Join query operation may include a build phase, a probe phase, and a query phase, each running on different computing nodes deployed in a distributed system.

Here, the build phase is the build phase as shown in FIG. 2. The probe phase is the probe phase as shown in FIG. 2. The query phase is the Hash Join phase as shown in FIG. 2. For the build phase, the probe phase, and the Hash Join phase, each may run on a different computing node deployed in a distributed system in which multiple computing nodes may be deployed. The computing nodes are also execution nodes, and an execution node may correspond to an operator. Illustratively, the build phase may correspond to a scan operator, the probe phase may correspond to a scan operator or a join operator, the Hash Join phase may correspond to a join operator, and the respective input sources (e.g., tables and sub-queries) of the various phases may be referred to as a build end, a probe end, and a query end.

Exemplarily, after the acquisition of the data table query instruction, the hash data table may be constructed based on the tabular data corresponding to the target connection column of the first data table using the corresponding computing node of the build phase, and then, the step of S103 described below may be carried out continuously using the computing node, so that the step of determining whether the running filter needs to be used is sunk to the specific computing node in the distributed system to improve the accuracy of the determination, thereby achieving proper use of the running filter.

S103: determining, based on table statistical information of the hash data table, whether to construct a runtime filter for filtering a second data table of the plurality of data tables in a probe phase of the Hash Join query operation.

Here, the table statistical information may include information all of which can be used to determine the number of output rows of the Join operator corresponding to the Hash Join phase, for example, the table statistical information may include the number of table rows corresponding to the hash data table, the distinct value of the target Join column, and the like information.

The probe phase is the probe phase as shown in FIG. 2, and the second data table is the one of the two data tables indicated by the data table query instruction other than the first data table, which may in particular be the larger one of the two data tables.

The runtime filter may be used to perform data filtering on the data in the second data table during the probe phase to filter out data that will not hit the query phase to reduce data transfer and computation when performing the Join operation of the query phase.

In an implementation, after constructing the hash data table using the computing node corresponding to the build phase, table statistical information corresponding to the hash data table may be determined using the same computing node, and then the performance improvement and performance consumption of using the runtime filter at the probe phase may be determined based on the table statistical information, and whether the runtime filter needs to be constructed may be determined based on the relationship of the performance improvement and the performance consumption.

Optionally, the above S103 may be performed using a pre-trained cost calculation model, which may in particular be a Cost-Based Optimization (CBO model). Illustratively, the performance improvement and performance consumption using the runtime filter may be estimated from the table statistical information of the hash data table using the pre-trained CBO model by the computing node used for performing the build phase. It can then be determined whether a runtime filter needs to be built based on the relationship between the two of the performance improvement and the performance consumption.

In this way, in the distributed system, in executing the Hash Join instruction, it is possible to use the corresponding computing node of the build phase to determine whether or not to construct the runtime filter based on the true statistical information in executing the build phase with a targeted and independent judgment, improving the accuracy and plausibility of the determining result, and thus realizing a reasonable use of the runtime filter.

In an implementation, the above S103 may be implemented as follows:

S103-1: determining a query performance improvement result after constructing the runtime filter according to the table statistical information.

Here, the query performance improvement result is used to indicate that the improved query performance of performing the data query after performing the data filtering on the second data table using the runtime filter corresponds to the amount of resources that can be saved. Illustratively, the query performance improvement result may be expressed using a total cost reduction by runtime filter.

In particular, a pre-trained CBO model may be used to determine the query performance improvement result based on the table statistical information.

In an implementation, the query performance improvement result may be determined based on a data selection rate at which the runtime filter selects data in the second data table. If the data selection rate is high, this means that a large portion of the data in the second data table can be filtered out, which in turn results in a large query performance improvement; If the data selection rate is low, this means that only very little of the data in the second data table can be filtered out, and the resulting performance improvement may be less than the performance expenditure. Thus, in a specific implementation, the above S103-1 may be implemented as follows:

S103-1-1: determining a data selection rate corresponding to the runtime filter after the runtime filter is constructed according to the table statistical information.

Here, the data selection rate is used to characterize the runtime filter's selection rate for data in the second data table.

The data selection rate may be determined based on output row information and input row information of the second data table corresponding to the probe phase, wherein the output row information may be calculated based on table statistical information using the CBO model. The input row number information may be the row number information of the second data table, and may be, for example, the row number information corresponding to the target join column.

Thus, the output row number information of the second data table may be determined from the table statistical information and the data information of the second data table using the pre-trained CBO model. Then, the data selection rate can be determined based on the ratio of the number of output rows indicated by the output row number information to the number of input rows indicated by the input row number information.

In an implementation, for S103-1-1, the following steps may be further implemented:

S103-1-1-1: determining output row number information at the query phase of the Hash Join query operation based on the table statistical information and estimated table statistical information corresponding to the second data table.

Here, the estimated statistical information may be all of the information corresponding to the second data table that can be used to determine the number of output rows of the Join operator corresponding to the Hash Join phase, for example, the estimated statistical information may include the number of table rows corresponding to the second data table, the distinct value of the target join column, and the like. The query phase is the Hash Join phase as shown in FIG. 2, and the output row information of the query phase is the output row information of the Join operator and the corresponding output row information of the second data table of the probe phase.

Since the data selection rate can be determined based on the output row number information and the input row number information of the second data table, and the input row number information can be obtained directly based on the true row number of the second data table, the accuracy of the data selection rate can be strongly related to the output row number information. While in the actual calculation process, the output row number information may be associated with the data tables participating in the Hash Join (i.e., the second data table and the hash data table).

In particular, for the second data table, the CBO model may be used to estimate the estimated statistical information corresponding to the second data table based on a base table corresponding to the second data table.

Figure 3:
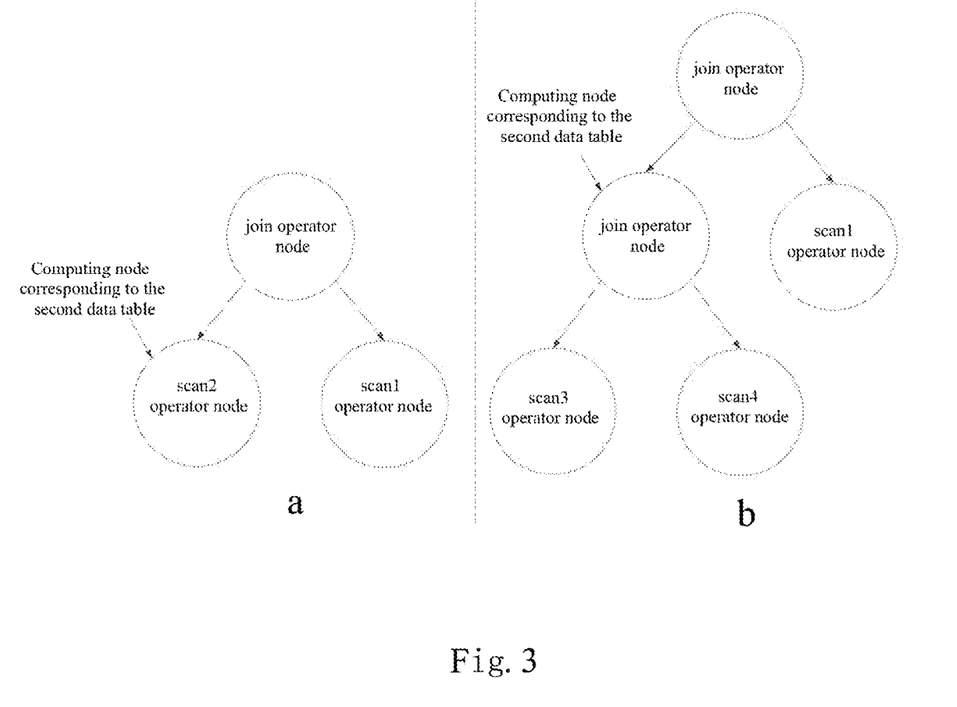
FIG. 3 shows a schematic comparison of a second data table according to embodiments of the present disclosure.

In an implementation, due to the usage characteristics of the runtime filter, only a base table that participate in the Hash Join (i.e., only the scan operator) and no other operators (e.g., the Join operator) can be used when calculating the estimated table statistical information corresponding to the second data table. However, since in an actual implementation, the second data table may also be a data table that needs to be obtained after performing a Hash Join operation, i.e. the second data table corresponds to a Join operator node rather than a scan operator node. In this case, a base table corresponding to the second data table needs to be found, on the basis of which the estimated statistical information is determined. Herein, the base table can be understood as the base table from which the second data table is obtained, which table corresponds to the probe phase, which is constructed directly. FIG. 3 is a diagram illustrating a comparison of a second data table according to embodiments of the present disclosure. As shown in "a" part of the FIG. 3, the second data table is a directly constructed data table, and the second data table corresponds to a scan operator node (i.e., scan2 operator node), i.e., the second data table is not obtained by performing a Hash Join operation on other data tables. Also, the scan1 operator node in the "a" part of FIG. 3 corresponds to the build phase and the scan2 operator node in the "a" part of FIG. 3 corresponds to the probe phase. In the "b" part of FIG. 3, computing node corresponding to the second data table is a join operator node, and two lower-level computing nodes (i.e., a scan3 operator node and a scan4 operator node in the "b" part of FIG. 3) are further included below the computing node, so that the second data table is obtained after performing a Hash Join operation on other data tables, and the left-side scan3 operator node of the two lower-level computing nodes corresponds to the probe phase and the right-side scan4 operator node corresponds to the build phase, so that the left-side scan3 operator node can be taken as the base table for the second data table. In this implementation, a base table corresponding to the second data table may be determined, and then the CBO model may be used to determine the estimated table statistical information corresponding to the second data table based on the base table.

In particular, in the case where the second data table is a data table that needs to be obtained after performing a Hash Join operation, the estimated table statistical information may be determined as follows:

S1: when there is at least one low-level leaf node of a computing node to which the second data table corresponds, determining a target leaf node of a lowest level of the at least one low-level.

Illustratively, in the "b" part of FIG. 3, there is a low level of the computation nodes including the second data table, the lower level of the leaf nodes including the scan3 operator node and the scan4 operator node.

In an implementation, when the computing node corresponding to the second data table is a join operator node, the second data table may be described as not being a base table. In this case, it may be determined that the computing node corresponding to the second data table has a connection relationship and belongs to the leaf nodes of the lower levels, and then the leaf nodes at the lowest level of the lower levels may be determined. Thereafter, a leaf node corresponding to the probe phase among leaf nodes at the lowest level may be taken as a target leaf node.

S2: determining the estimated statistical information corresponding to the second data table according to a node data table corresponding to the target leaf node.

Here, the node data table is the data table corresponding to the target leaf node.

Illustratively, the CBO model may be used to determine the estimated statistical information corresponding to the second data table based on the tabular data of the node data table corresponding to the target leaf node. As such, the CBO model can be used in the compute node corresponding to the build phase, thus, enabling targeted usage for each compute node.

With respect to the hash data table, in the related art, since it is necessary to determine whether to use the runtime filter before performing the build phase, the actual table statistical information cannot be obtained, and only the estimated statistical information based on the build phase are obtained, resulting in the problem that the related art scheme has low accuracy, which affects the use of the runtime filter. In the present disclosure, since the probe phase can be executed only after the execution of the build phase is completed due to the special execution model of the Hash Join, it is possible to directly acquire the actual table statistical information s of the hash data table generated when the build phase is executed by dropping the step of determining whether the runtime filter needs to be used to the computing node corresponding to the build phase. Further, by directly using the true table statistical information of the hash data table generated by the build phase to determine whether to use the runtime filter, the accuracy of the determining result can be effectively improved, thereby enabling a reasonable use of the runtime filter.

In an implementation of S103-1-1-1, the actual table statistical information corresponding to the hash data table may be obtained after the hash data table corresponding to the build phase is constructed, and the estimated table statistical information corresponding to the second data table may be determined based on the base table corresponding to the second data table by using the CBO model. Then, the corresponding output row information of the join operator can be determined based on the table statistical information and the estimated statistical information.

S103-1-1-2: determining the data selection rate based on the output row number information and input row number information of the second data table.

Here, the input row number information of the second data table may be determined according to a base table to which the second data table corresponds. In an implementation, the data selection rate may be determined using a ratio of the number of output rows indicated by the output row number information and the number of input rows indicated by the input row number information.

S103-1-2: determining the query performance improvement result according to the data selection rate.

Illustratively, the query performance improvement result after using the runtime filter may be determined based on the data selection rate and the tabular data corresponding to the target join column of the second data table.

S103-2: determining a query performance consumption result after constructing the runtime filter according to a table data amount of the hash data table.

Here, the query performance consumption result is used to indicate the resource consumption of building the runtime filter and the resource consumption in data filtering the second data table using the runtime filter. Illustratively, query performance consumption result may be expressed by a hash build cost.

Illustratively, the query performance consumption result may be determined according to the size of the tabular data amount of the hash data table, the size of the tabular data amount of the second data table, and the complexity of the generated data filter condition.

S103-3: determining whether to construct the runtime filter according to a comparing result of the query performance improvement result and the query performance consumption result.

Here, the comparison result is used to indicate a size relationship between the amount of resources saved using the runtime filter and the amount of resources consumed using the runtime filter.

In an implementation, when the comparing result indicates that the amount of resources saved is greater than the amount of resources consumed, it may be determined that a runtime filter needs to be built and used to improve query performance and speed; Conversely, when the comparing result indicates that the amount of resources saved is not greater than the amount of resources consumed, it may be determined that a runtime filter does not need to be built and used.

S104: determining a data query result with a constructed runtime filter based on the hash data table and the second data table in response to it is determined that the runtime filter needs to be constructed.

Here, the data query result is a query result that matches the data table query instruction, and specifically, may be a query result obtained by performing a Hash Join on two data tables, which may include the queried data. It can be understood that, the data query result may be empty.

In particular, after a determination is made as to whether a runtime filter needs to be built, a probe phase as shown in FIG. 2 may be performed. Here, the runtime filter may be constructed if the result of the determination indicates that the runtime filter needs to be constructed, that is, if it is determined that the performance increase by using the runtime filter is greater than the performance consumption. The constructed runtime filter may then be employed to perform a data filtering operation on the data in the second data table based on the data in the hash data table. Thereafter, a Hash Join phase as shown in FIG. 2 may be performed based on the data filter results and the data in the hash data table, resulting in a data query result.

In an implementation, the step of determining the results of the data query may be implemented as follows:

Step 1: generating a data filter condition based on the hash data table.

Here, the data filter condition is used to filter data in the second data table, for example, may be used to filter tabular data corresponding to a target join column of the second data table. The data filter condition relates to query conditions that are dynamically generated after the hash data table is obtained, and different hash data tables correspond to different data filter conditions.

Illustratively, the filter condition corresponding to the bloom filter may be generated from the hash values in the hash data table, or the inlist filter condition may be generated from the hash values in the hash data table.

Step 2: filtering data of the second data table according to the data filter condition with the constructed runtime filter to obtain filtered data.

Here, the table filtered data is data stored after data filtering the second data table, and the table filtered data is data that can hit the query phase. When implemented, the table filtered data may be empty or may be part or all of the data in the second data table.

In particular, in the case of it is determined that a runtime filter needs to be built, the data stored in the hash data structure in the hash data table may be passed to the corresponding prob table (i.e., the second data table) of the probe phase by way of data filter criteria. Then, the data filtering may be performed on the tabular data corresponding to the target data column in the second data table according to the data filtering criteria using the runtime filter of the completion of the construction, thereby obtaining the table filtered data corresponding to the probe phase.

Step 3: determining the data query result based on the filtered data and the hash data table.

In an implementation, after obtaining the table filtered data corresponding to the probe phase and the hash data table corresponding to the build phase, a data join operation may be performed on the data in the table filtered data and the hash data table, and a data query result for both data tables may be obtained based on the join result.

On the other hand, if the result of the determination indicates that it is not necessary to construct the runtime filter, i.e., when it is determined that the performance increase by using the runtime filter is less than or equal to the performance consumption, the probe phase may be performed based on the hash data table and the second data table using the existing calculation. Finally, based on the execution result of the probe phase and the execution result of the build phase, a data query result is obtained.

Thus, after constructing the hash data table based on the table data corresponding to the target Join column of the first data table, and then determining whether to construct a runtime filter for data filtering (i.e., runtime filter), the actual table statistical information corresponding to the hash data table can be used to determine the filtering effect of using the runtime filter, and then accurately determine whether the runtime filter is suitable for a current Hash Join query, i.e., accurately determine whether the runtime filter can improve the query performance of the current Hash Join query. Then, in a case where it is determined that a runtime filter needs to be constructed, constructing the runtime filter and utilizing the runtime filter, accurate filtering of the data that needs to be queried can be achieved, after an accurate data query result is obtained, improvement of data query performance is guaranteed, and reasonable use of the runtime filter is achieved.

It will be appreciated by those skilled in the art that in the above-described method of the specific implementation, the order in which the steps are written does not imply a strict order of execution and constitutes any limitation on the implementation of the process, and that the specific order of execution of the steps should be determined by their functionality and possibly the underlying logic.

Based on the same inventive concept, the query apparatus for a data table in a database corresponding to the query method for a data table in a database is further provided in the embodiments of the present disclosure, since the principle of solving the problem by the apparatus in the embodiments of the present disclosure is similar to the query method for a data table in a database described above in the embodiments of the present disclosure, the implementation of the apparatus can refer to the implementation of the method, and the repetitions are not repeated.

Figure 4:
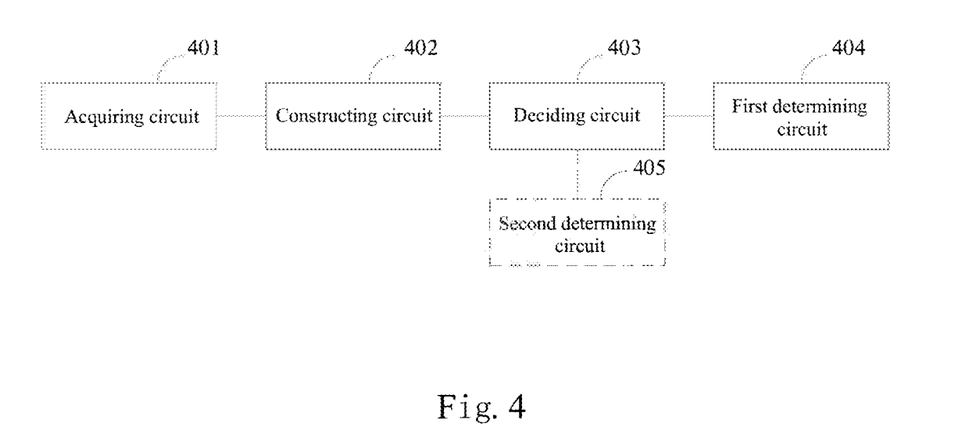
FIG. 4 shows a schematic diagram of a query apparatus for a data table in a database according to embodiments of the present disclosure.

As shown in FIG. 4, a schematic diagram of the query apparatus for a data table in a database provided by the embodiments of the present disclosure, including:

an acquiring circuit 401, configured to acquire a data table query instruction, wherein the data table query instruction is used to perform a Hash Join query operation on target join columns of a plurality of data tables in the database;

a constructing circuit 402, configured to construct, in a build phase of the Hash Join query operation, a hash data table according to tabular data corresponding to a target join column of a first data table among the plurality of data tables;

a deciding circuit 403, configured to determine, based on table statistical information of the hash data table, whether to construct a runtime filter for filtering a second data table of the plurality of data tables in a probe phase of the Hash Join query operation;

a first determining circuit 404, configured to determine a data query result with a constructed runtime filter based on the hash data table and the second data table in response to it is determined that the runtime filter needs to be constructed.

In an implementation, the first determining circuit 404, when determining a data query result with a constructed runtime filter based on the hash data table and the second data table in response to it is determined that the runtime filter needs to be constructed, is configured to:

generate a data filter condition based on the hash data table;

filter data of the second data table according to the data filter condition with the constructed runtime filter to obtain filtered data;

determine the data query result based on the filtered data and the hash data table.

In an implementation, the Hash Join query operation includes the build phase, the probe phase and a query phase, and wherein the build phase, the probe phase and the query phase run on different computing nodes deployed in a distributed system respectively.

In an implementation, the deciding circuit 403, when determining, based on table statistical information of the hash data table, whether to construct a runtime filter for filtering a second data table of the plurality of data tables in a probe phase of the Hash Join, is configured to:

determine a query performance improvement result after constructing the runtime filter according to the table statistical information;

determine a query performance consumption result after constructing the runtime filter according to a table data amount of the hash data table; and determine whether to construct the runtime filter according to a comparing result of the query performance improvement result and the query performance consumption result.

In an implementation, the deciding circuit 403, when determining a query performance improvement result after constructing the runtime filter according to the table statistical information, is configured to:

determine a data selection rate corresponding to the runtime filter after the runtime filter is constructed according to the table statistical information; and determine the query performance improvement result according to the data selection rate.

In an implementation, the deciding circuit 403, when determining a data selection rate corresponding to the runtime filter after the runtime filter is constructed according to the table statistical information, is configured to:

determine output row number information at the query phase of the Hash Join query operation based on the table statistical information and estimated table statistical information corresponding to the second data table; and determine the data selection rate based on the output row number information and input row number information of the second data table.

In an implementation, the apparatus further includes:

a second determining circuit 405, configured to determine the estimated statistical information according to the following steps:

when there is at least one low-level leaf node of a computing node to which the second data table corresponds, determine a target leaf node of a lowest level of the at least one low-level; and determine the estimated statistical information corresponding to the second data table according to a node data table corresponding to the target leaf node.

The description of the process flow of the respective modules or circuits in the apparatus, and the interaction flow between the respective modules (or circuits) can refer to the related description in the above method embodiments, which will not be detailed here.

Figure 5:
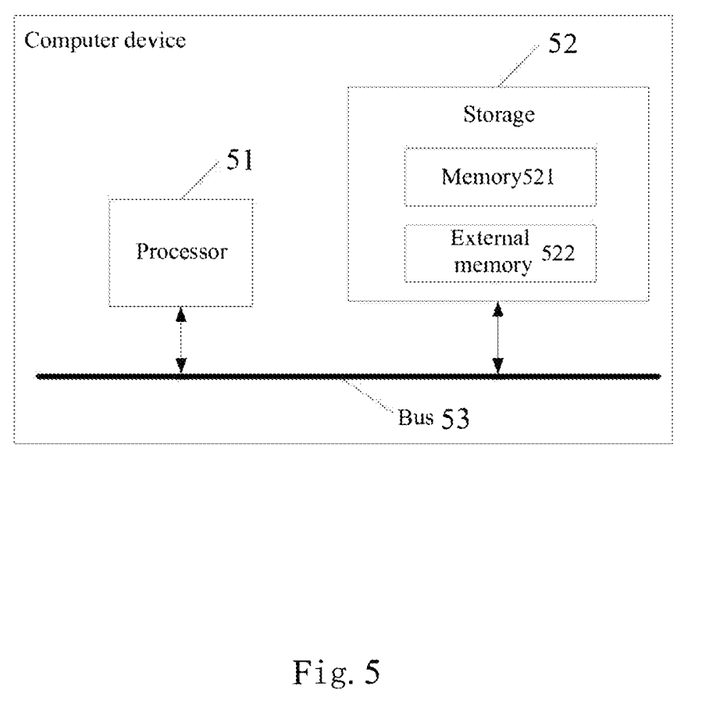
FIG. 5 shows a structural schematic diagram of a computer device according to embodiments of the present disclosure.

Based on the same technical conception, embodiments of the present disclosure further provide a computer device. Referring to FIG. 5, a structural diagram of a computer device according to embodiments of the present disclosure includes:

a processor 51, a storage 52, and a bus 53. Wherein the storage 52 stores machine-readable instructions executable by the processor 51, the processor 51 is configured to execute the machine-readable instructions stored in the storage 52, and when executed by the processor 51, the processor 51 performs the following steps: S101: acquiring a data table query instruction, wherein the data table query instruction is used to perform a Hash Join query operation on target join columns of a plurality of data tables in the database; S102: constructing, in a build phase of the Hash Join query operation, a hash data table according to tabular data corresponding to a target join column of a first data table among the plurality of data tables; S103: determining, based on table statistical information of the hash data table, whether to construct a runtime filter for filtering a second data table of the plurality of data tables in a probe phase of the Hash Join query operation; and S104: determining a data query result with a constructed runtime filter based on the hash data table and the second data table in response to it is determined that the runtime filter needs to be constructed.

The storage 52 includes a memory 521 and an external memory 522; The memory 521, also referred to herein as an internal memory, is used to temporarily store arithmetic data in the processor 51 and data exchanged with an external memory 522 such as a hard disk, and the processor 51 exchanges data with the external memory 522 through the memory 521. When the computer device is operated, the processor 51 and the memory 52 communicate through the bus 53 so that the processor 51 executes instructions as mentioned in the above-mentioned method embodiments.

The embodiments of the present disclosure further provide a non-transitory computer-readable storage medium having a computer program stored thereon, which, when executed by a processor, executes the steps of the query method for a data table in a database described in the above method embodiments. The storage medium may be a volatile or non-volatile computer readable storage medium.

A computer program product of the query method for a data table in a database provided by embodiments of the present disclosure includes a computer readable storage medium storing program code, the program code includes instructions operable to perform the steps of the query method for a data table in a database described in the above method embodiments, which can be specifically referred to the above method embodiments, and will not be described in detail herein.

The computer program product may in particular be implemented by means of hardware, software or a combination thereof. In an alternative embodiment, the computer program product is embodied as a computer storage medium, and in another alternative implementation, the computer program product is embodied as a software product, such as a Software Development Kit (SDK) or the like.

It can be clearly understood by those skilled in the art that, for convenience and conciseness of description, the specific working processes of the apparatus described above may refer to the corresponding processes in the foregoing method embodiments, which are not repeated herein. While the present disclosure provides several embodiments, it is to be understood that the disclosed apparatus and methods may be implemented in other ways. The apparatus embodiments described above are merely illustrative, for example, the division of the elements is merely a logical function, and other divisions may be actually implemented, for example, multiple elements or components may be combined, or some features may be omitted, or not implemented. Further, the coupling or direct coupling or communication connection between each other shown or discussed may be an indirect coupling or communication connection through some communication interface, device or unit, which may be electrical, mechanical or otherwise.

The elements illustrated as separate elements may or may not be physically separate, and the elements shown as elements may or may not be physical elements, i.e. may be located at one place, or may be distributed over a plurality of network elements. Some or all of the elements may be selected according to actual needs to achieve the purpose of the present disclosure.

In addition, each functional unit in each embodiment of the present disclosure may be integrated in one processing unit, each unit may be physically present separately, and two or more units may be integrated in one unit.

The functions, if implemented in the form of a software functional unit and sold or used as a stand-alone product, may be stored in a processor-executable non-volatile computer-readable storage medium. Based on such an understanding, the technical solution of the present disclosure in essence or the part contributing to the prior art or the part of the technical solution may be embodied in the form of a software product, which is stored in a storage medium, and includes a plurality of instructions for causing a computer device (which may be a personal computer, a server, or a network device, etc.) to perform all or a part of the steps of the methods of the various embodiments of the present disclosure. The aforementioned storage media include various media that can store program codes, such as a compact disk, a removable hard disk, a Read-Only Memory (ROM), a Random Access Memory (RAM), a magnetic disk, or an optical disk.

If the present technical solution relates to personal information, the product using the present technical solution explicitly informs the personal information processing rules before processing the personal information and obtains the individual's own consent. If the subject matter relates to sensitive personal information, a product employing the subject matter has obtained individual consent prior to processing sensitive personal information, and at the same time satisfies the "explicit consent" requirement. For example, at a personal information collection device such as a camera, the personal information is collected by setting a distinctive identification that the personal information has entered the personal information collection range, and the personal information is deemed to be collected if the person voluntarily enters the collection range, or obtaining the individual's authorization by popping up information or asking the individual to upload his or her personal information himself or herself in the case where the individual information processing rules are informed by the obvious identification/information on the apparatus of the personal information processing; Among other things, the personal information processing rule may include information such as a personal information handler, a purpose of personal information processing, a processing manner, a kind of personal information processed, and the like.

Finally, it should be noted that the above-described embodiments are only specific implementations of the present disclosure to illustrate the technical solutions of the present disclosure rather than to limit the scope of the present disclosure, and the scope of protection of the present disclosure is not limited thereto. Although the present disclosure has been described in detail with reference to the foregoing embodiments, those skilled in the art should appreciate that any person skilled in the art may modify the technical solutions described in the foregoing embodiments or may conceive of variations, or may substitute equivalents to some of the technical features thereof, within the technical scope of the present disclosure. While these modifications, variations or replacements, which do not make the essence of the corresponding technical solutions depart from the spirit and scope of the technical solutions of the embodiments of the present disclosure, shall be covered within the protection scope of the present disclosure. Therefore, the protection scope of the present disclosure should be subject to the protection scope defined in the claims.

What is claimed is:

1. A query method for a data table in a database, used for a distributed system which comprises a plurality of computing nodes, wherein the method comprises:
receiving a data table query instruction, wherein the data table query instruction is used to perform a Hash Join query operation on target join columns of a plurality of data tables in the database;
constructing, by a computing node for running a build phase of the Hash Join query operation among the plurality of computing nodes, in the build phase of the Hash Join query operation, a hash data table according to tabular data corresponding to a target join column of a first data table among the plurality of data tables, to store the tabular data corresponding to the target join column into a data structure of the hash data table located in a memory of the distributed system;
determining, by the computing node for running the build phase of the Hash Join query operation among the plurality of computing nodes, based on table statistical information of the hash data table, whether to construct a runtime filter for filtering a second data table of the plurality of data tables in a probe phase of the Hash Join query operation;
determining that the runtime filter requires to be constructed in the probe phase of the Hash Join query operation; and
in response to determining that the runtime filter requires to be constructed in the probe phase of the Hash Join query operation, determining, by a computing node for running the probe phase of the Hash Join query operation among the plurality of computing nodes, a data query result with the runtime filter that is constructed in the probe phase of the Hash Join query operation based on the hash data table and the second data table.

2. The method according to claim 1, wherein the determining a data query result with the runtime filter that is constructed in the probe phase of the Hash Join query operation based on the hash data table and the second data table comprises:
generating a data filter condition based on the hash data table;
filtering data of the second data table according to the data filter condition with the runtime filter to obtain filtered data; and
determining the data query result based on the filtered data and the hash data table.

3. The method according to claim 1, wherein the Hash Join query operation comprises the build phase, the probe phase and a query phase, and wherein the build phase, the probe phase and the query phase run on different computing nodes deployed in the distributed system respectively.

4. The method according to claim 1, wherein the determining, based on table statistical information of the hash data table, whether to construct a runtime filter for filtering a second data table of the plurality of data tables in a probe phase of the Hash Join comprises:
determining a query performance improvement result according to the table statistical information, wherein the query performance improvement result is used to indicate query performance that is improved when using the runtime filter for filtering the second data table;
determining a query performance consumption result according to a table data amount of the hash data table, wherein the query performance consumption result is used to indicate resource consumption when using the runtime filter for filtering the second data table; and
determining whether to construct the runtime filter according to a comparing result of the query performance improvement result and the query performance consumption result.

5. The method according to claim 4, wherein the determining a query performance improvement result according to the table statistical information comprises:
determining a data selection rate corresponding to the runtime filter according to the table statistical information; and
determining the query performance improvement result according to the data selection rate.

6. The method according to claim 5, wherein the determining a data selection rate corresponding to the runtime filter according to the table statistical information comprises:
determining output row number information at the query phase of the Hash Join query operation based on the table statistical information and estimated table statistical information corresponding to the second data table; and determining the data selection rate based on the output row number information and input row number information of the second data table.

7. The method according to claim 6, wherein each computing node in the plurality of computing nodes is used for executing an operator, and a plurality of computing nodes forms a hierarchical structure, the estimated table statistical information is determined according to the following steps:

when there is at least one leaf node of a computing node to which the second data table corresponds, determining a target leaf node of a lowest level of the at least one leaf node, wherein in the hierarchical structure, the at least one leaf node is at least one computing node connecting with the computing node to which the second data table corresponds and having a lower level than a level of the computing node to which the second data table corresponds; and determining the estimated statistical information corresponding to the second data table according to a node data table corresponding to the target leaf node.

8. A distributed system which comprises a plurality of computing nodes and a computer device, wherein the computer device comprises: a processor and a memory storing machine-readable instructions executable by the processor, wherein the processor is configured to execute the machine-readable instructions stored in the memory, the machine-readable instructions, when executed by the processor, cause the distributed system to implement the steps of:

receiving, by the computer device, a data table query instruction, wherein the data table query instruction is used to perform a Hash Join query operation on target join columns of a plurality of data tables in the database;

constructing, by a computing node for running a build phase of the Hash Join query operation among the plurality of computing nodes, in the build phase of the Hash Join query operation, a hash data table according to tabular data corresponding to a target join column of a first data table among the plurality of data tables, to store the tabular data corresponding to the target join column into a data structure of the hash data table located in a memory of the distributed systems;

determining, by the computing node for running the build phase of the Hash Join query operation among the plurality of computing nodes, based on table statistical information of the hash data table, whether to construct a runtime filter for filtering a second data table of the plurality of data tables in a probe phase of the Hash Join query operation;

determining that the runtime filter requires to be constructed in the probe phase of the Hash Join query operation; and in response to determining that the runtime filter requires to be constructed in the probe phase of the Hash Join query operation, determining, by a computing node for running the probe phase of the Hash Join query operation among the plurality of computing nodes, a data query result with the runtime filter that is constructed in the probe phase of the Hash Join query operation based on the hash data table and the second data table.

9. The distributed system according to claim 8, wherein the step of determining a data query result with the runtime filter that is constructed in the probe phase of the Hash Join query operation based on the hash data table and the second data table comprises:

generating a data filter condition based on the hash data table;

filtering data of the second data table according to the data filter condition with the runtime filter to obtain filtered data; and determining the data query result based on the filtered data and the hash data table.

10. The distributed system according to claim 8, wherein the Hash Join query operation comprises the build phase, the probe phase and a query phase, and wherein the build phase, the probe phase and the query phase run on different computing nodes deployed in the distributed system respectively.

11. The distributed system according to claim 8, wherein the step of determining, based on table statistical information of the hash data table, whether to construct a runtime filter for filtering a second data table of the plurality of data tables in a probe phase of the Hash Join comprises:

determining a query performance improvement result according to the table statistical information, wherein the query performance improvement result is used to indicate query performance that is improved when using the runtime filter for filtering the second data table;

determining a query performance consumption result according to a table data amount of the hash data table, wherein the query performance consumption result is used to indicate resource consumption when using the runtime filter for filtering the second data table; and determining whether to construct the runtime filter according to a comparing result of the query performance improvement result and the query performance consumption result.

12. The distributed system according to claim 11, wherein the step of determining a query performance improvement result according to the table statistical information comprises:

determining a data selection rate corresponding to the runtime filter according to the table statistical information; and determining the query performance improvement result according to the data selection rate.

13. The distributed system according to claim 12, wherein the step of determining a data selection rate corresponding to the runtime filter according to the table statistical information comprises:

determining output row number information at the query phase of the Hash Join query operation based on the table statistical information and estimated table statistical information corresponding to the second data table; and determining the data selection rate based on the output row number information and input row number information of the second data table.

14. The distributed system according to claim 13, wherein each computing node in the plurality of computing nodes is used for executing an operator, and a plurality of computing nodes forms a hierarchical structure, the estimated table statistical information is determined according to the following steps:

when there is at least one leaf node of a computing node to which the second data table corresponds, determining a target leaf node of a lowest level of the at least one leaf node, wherein in the hierarchical structure, the at least one leaf node is at least one computing node connecting with the computing node to which the second data table corresponds and having a lower level than a level of the computing node to which the second data table corresponds; and determining the estimated statistical information corresponding to the second data table according to a node data table corresponding to the target leaf node.

15. A non-transitory computer-readable storage medium, used for a distributed system which comprises a plurality of computing nodes, wherein the storage medium has a computer program stored thereon which, when executed by a computer device and the plurality of computing nodes, cause the distributed system to implement the steps of:

receiving, by the computer device, a data table query instruction, wherein the data table query instruction is used to perform a Hash Join query operation on target join columns of a plurality of data tables in the database;

constructing, by a computing node for running a build phase of the Hash Join query operation among the plurality of computing nodes, in the build phase of the Hash Join query operation, a hash data table according to tabular data corresponding to a target join column of a first data table among the plurality of data table, to store the tabular data corresponding to the target join column into a data structure of the hash data table located in a memory of the distributed systems;

determining, by the computing node for running the build phase of the Hash Join query operation among the plurality of computing nodes, based on table statistical information of the hash data table, whether to construct a runtime filter for filtering a second data table of the plurality of data tables in a probe phase of the Hash Join query operation;

determining that the runtime filter requires to be constructed in the probe phase of the Hash Join query operation; and in response to determining that the runtime filter requires to be constructed in the probe phase of the Hash Join query operation, determining, by a computing node for running the probe phase of the Hash Join query operation among the plurality of computing nodes, a data query result with the runtime filter that is constructed in the probe phase of the Hash Join query operation based on the hash data table and the second data table.

16. The non-transitory computer-readable storage medium according to claim 15, wherein the step of determining a data query result with the runtime filter that is constructed in the probe phase of the Hash Join query operation based on the hash data table and the second data table comprises:

generating a data filter condition based on the hash data table;

filtering data of the second data table according to the data filter condition with the runtime filter to obtain filtered data; and determining the data query result based on the filtered data and the hash data table.

17. The non-transitory computer-readable storage medium according to claim 15, wherein the Hash Join query operation comprises the build phase, the probe phase and a query phase, and wherein the build phase, the probe phase and the query phase run on different computing nodes deployed in the distributed system respectively.

18. The non-transitory computer-readable storage medium according to claim 15, wherein the step of determining, based on table statistical information of the hash data table, whether to construct a runtime filter for filtering a second data table of the plurality of data tables in a probe phase of the Hash Join comprises:

determining a query performance improvement result according to the table statistical information, wherein the query performance improvement result is used to indicate query performance that is improved when using the runtime filter for filtering the second data table;

determining a query performance consumption result according to a table data amount of the hash data table, wherein the query performance consumption result is used to indicate resource consumption when using the runtime filter for filtering the second data table; and determining whether to construct the runtime filter according to a comparing result of the query performance improvement result and the query performance consumption result.

19. The non-transitory computer-readable storage medium according to claim 18, wherein the step of determining a query performance improvement result according to the table statistical information comprises:

determining a data selection rate corresponding to the runtime filter according to the table statistical information; and determining the query performance improvement result according to the data selection rate.

20. The non-transitory computer-readable storage medium according to claim 19, wherein the step of determining a data selection rate corresponding to the runtime filter according to the table statistical information comprises:

determining output row number information at the query phase of the Hash Join query operation based on the table statistical information and estimated table statistical information corresponding to the second data table; and determining the data selection rate based on the output row number information and input row number information of the second data table.

* * * * *